J. F. HAMMRICH.
SELF LOCKING BOLT.
APPLICATION FILED DEC. 20, 1915.

1,321,033.

Patented Nov. 4, 1919.

Witnesses.

Inventor.
Joseph Franz Hammrich

UNITED STATES PATENT OFFICE.

JOSEPH FRANZ HAMMRICH, OF CLEVELAND, OHIO.

SELF-LOCKING BOLT.

1,321,033. Specification of Letters Patent. Patented Nov. 4, 1919.

Application filed December 20, 1915. Serial No. 67,850.

*To all whom it may concern:*

Be it known that I, JOSEPH FRANZ HAMMRICH, a citizen of the United States, residing at 5710 Lorain avenue, in the city of Cleveland, in the county of Cuyahoga, in the State of Ohio, have invented a new and useful Fastening Device in Self-Locking Bolts, of which the following is a specification.

This invention relates to means for locking a nut upon a bolt, and contemplates the employment of a washer having a lug extending in its bore and designed to be received in the groove in the shank of a bolt, the said washer, upon its outer face, being formed with four radially disposed, equally spaced shoulders, the said outer face of the washer, between the said shoulders, being inclined from the upper edge of one of the shoulders to the lower edge of the adjacent shoulder, and such inclination corresponding to the pitch of the threads of the bolt, the nut, which is screwed upon the bolt and which is designed to coengage with the washer, being likewise provided, upon its inner face, with four radially disposed equally spaced shoulders, the surfaces between the upper edges of the shoulders and the lower edge of the adjacent shoulders being inclined and such inclination corresponding to the pitch of the threads in the bore of the nut and likewise, to the pitch of the threads of the bolt, the said nut, when being screwed home upon the bolt designed to have its shoulders ratchet over the shoulders of the washer, at each one-fourth revolution of the nut, and when screwed entirely home to draw the bolt through the opening in the superstructure receiving the said bolt, in the direction of the nut, consequently compressing the washer against the said superstructure, and locking the nut upon the washer as well as upon the bolt.

I attain my object by the construction, combination and operative arrangement of parts set forth in the following description, and illustrated by the accompanying drawing.

Figure 1:
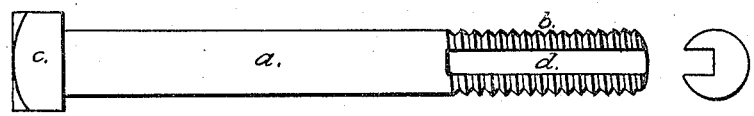
Figure 1 illustrates a side elevation and end view of the bolt.
Figure 2:
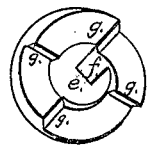
Fig. 2 is a perspective view of the washer.
Figure 3:
Fig. 3 shows an approximately central longitudinal sectional view through the washer.
Figure 4:
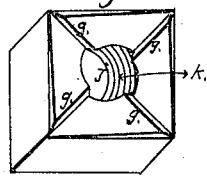
Fig. 4 is a perspective view of the nut, looking toward the inner face thereof.
Figure 5:
Fig. 5 is an approximately central longitudinal sectional view through the nut.
Figure 6:
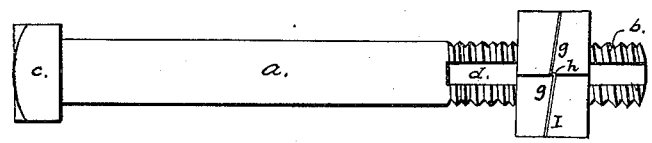
Fig. 6 is an elevation illustrating the parts assembled.

Referring now to the drawing in detail, $a$ designates an ordinary bolt, the shank of which being threaded as at $b$, and the said threaded portion $b$ is provided with an elongated slot $d$, while the head of the bolt is indicated by the character $c$.

The washer comprises a flat spring member, which, in the showing of the drawing, is round in plan, but, it is to be understood that the said washer may be square or rectangular if desired. The washer $e$, upon what I will term the outer face thereof, is formed with four equally spaced shoulders $g$. The inclined surface $I$ between the said shoulders being arranged at an angle in the upper edge of one of the said shoulders to the lower edge of the adjacent shoulder, and this angle corresponds to the pitch of the threads of the bolt. The straight walls provided by the shoulders equal each one-fourth of the pitch of the thread of the bolt, and the purpose of this arrangement will presently be apparent. The washer $e$ is provided with a lug $f$ projecting in the bore of the said washer and this lug is designed to be received in the groove $d$ of the bolt $a$.

The nut $h$, upon its inner face, is provided with equally spaced radially disposed shoulders $g'$, four in number, each of the said shoulders having a straight surface of a depth equal to one-fourth of the pitch of the threads in the bore of the nut, and consequently, equal to one-fourth of the pitch of the thread on the bolt. The angular surface $I'$ between the upper edge of one of the shoulders and the lower edge of the adjacent shoulders corresponds to the pitch of the threads in the bore of the nut, and likewise, to the pitch of the threads of the bolt.

When a bolt $a$ is passed through the opening therefor, in a suitable superstructure, the washer $e$ is arranged upon the said bolt, the lug $f$, as previously stated, being received in the groove $d$, and the said washer has its inner straight face contacting with the superstructure. The nut $h$ is now screwed upon the bolt, the shoulders thereof ratcheting over the shoulders of the washer, causing the bolt $a$ to be moved longitudinally in the direction of the nut, and when the nut is screwed entirely home on the bolt, the spring washer *e* will be forced into frictional contact with the superstructure and the shoulders of the nut will be brought to coengagement with the shoulders of the washer, thus effectively locking the nut upon the washer and the washer against the superstructure, and, consequently, also locking the nut upon the bolt. The arrangement of the depth of the shoulders upon both the washer and the nut is an important feature of this invention, the said depth, as stated, being equal to one-fourth of the pitch of the threads of both the nut and bolt. The arrangement of the four equally spaced shoulders is also an important feature of the invention, as were a greater or a less number of such shoulders employed, the elevation from the bottom of the angular depression between the said shoulders, to the top of the next depression would be so short or so long, as to cause the tearing or battering of the threads, which would result in a looseness between the nut and bolt, causing the wear upon the said bolt for the reason that the elevations or outer edges of the shoulders are all on a level or straight line with respect to the inner face of the nut, so by having the elongated depressions of the depth of the one-fourth pitch on the thread of the nut, the nut hugs the thread of the bolt tightly, while being screwed on to the bolt, all the way around, the said depressions or the said elongations will so tighten the nut to the washer that it will be impossible to move the nut either forward or backward. From the foregoing description, when taken in connection with the drawings, the advantages of the construction will, it is thought, be apparent without further detailed description.

Having thus described my invention, what I claim is:

The combination with a bolt having its shank provided with an elongated slot, a washer having a lug extending in the bore thereof designed to be received in the groove of the bolt, said washer, upon its outer face, having four equally spaced radially disposed shoulders, each of which being of a height equaling one-fourth of the pitch of the threads on the bolt, and the angular walls between the shoulders corresponding to the angular pitch of the said threads of the bolt, a nut screwed on the bolt and having its inner face formed with four equally spaced, radially disposed shoulders designed to coengage with the shoulders of the washer, the shoulders on the nut being of a depth equal to one-fourth of the threads in the bore of the nut and the pitch of the threads of the bolt, and the inclined surface between said shoulders corresponding to the inclination of the pitch of the threads on the bolt and nut.

JOSEPH FRANZ HAMMRICH.

Witnesses:
 FRANZ JOSEPH HAMMRICH,
 MARTIN KREJCI.

Copies of this patent may be obtained for five cents each, by addressing the "Commissioner of Patents, Washington, D. C."